United States Patent [19]
Segredo

[11] Patent Number: 5,873,302
[45] Date of Patent: Feb. 23, 1999

[54] PULP WASH SYSTEM

[75] Inventor: Guillermo T. Segredo, Lakeland, Fla.

[73] Assignee: FMC Corporation, Chicago, Ill.

[21] Appl. No.: 606,814

[22] Filed: Feb. 26, 1996

[51] Int. Cl.[6] ............................. A23N 1/00; A30B 9/14; A23L 2/00; A23L 2/06

[52] U.S. Cl. ............................. 99/510; 99/495; 99/516; 100/117; 100/147; 210/112; 210/415; 366/339

[58] Field of Search ........................... 99/275, 495, 483, 99/509–513, 516, 534–536; 366/336–340; 100/37, 98 R, 117, 105, 145, 108, 147–150, 292; 210/112, 409, 415, 698; 134/3, 7, 28, 41, 153, 403; 127/42, 43, 48, 53, 2, 3, 5

[56] References Cited

U.S. PATENT DOCUMENTS

| | | | |
|---|---|---|---|
| 3,731,613 | 5/1973 | Wolff et al. | 99/275 |
| 3,952,647 | 4/1976 | Holbrook et al. | 100/98 R |
| 4,275,648 | 6/1981 | Mouri et al. | 99/483 |
| 4,287,058 | 9/1981 | Larsen | 100/117 X |
| 4,300,449 | 11/1981 | Segredo | 99/496 |
| 4,313,372 | 2/1982 | Gerow et al. | 99/516 X |
| 4,518,621 | 5/1985 | Alexander | 99/511 X |
| 4,774,097 | 9/1988 | Bushman et al. | 99/495 X |
| 4,872,919 | 10/1989 | Bucher et al. | 134/3 |
| 4,905,586 | 3/1990 | Anderson et al. | 99/510 |
| 4,922,814 | 5/1990 | Anderson et al. | 99/495 X |
| 5,070,778 | 12/1991 | Cross et al. | 99/509 X |
| 5,244,685 | 9/1993 | Metcalf et al. | 99/484 X |
| 5,386,766 | 2/1995 | Segredo et al. | 99/495 |

*Primary Examiner*—Timothy F. Simone
*Attorney, Agent, or Firm*—Allen, Dyer, Doppelt, Milbrath & Gilchrist, P.A.

[57] ABSTRACT

A pulp wash system in which recovery of juice and sugar solids is enhanced by the provision of an in-line static mixer disposed in the line between a pump supplying pulp to a finisher and the finisher. A plurality of pulp inlet pumps and finishers may be connected in series. Further, in using a series of finishers, the liquid introduced into each finisher except for the last finisher comes from the liquid output from a subsequent or further downstream finisher.

8 Claims, 2 Drawing Sheets

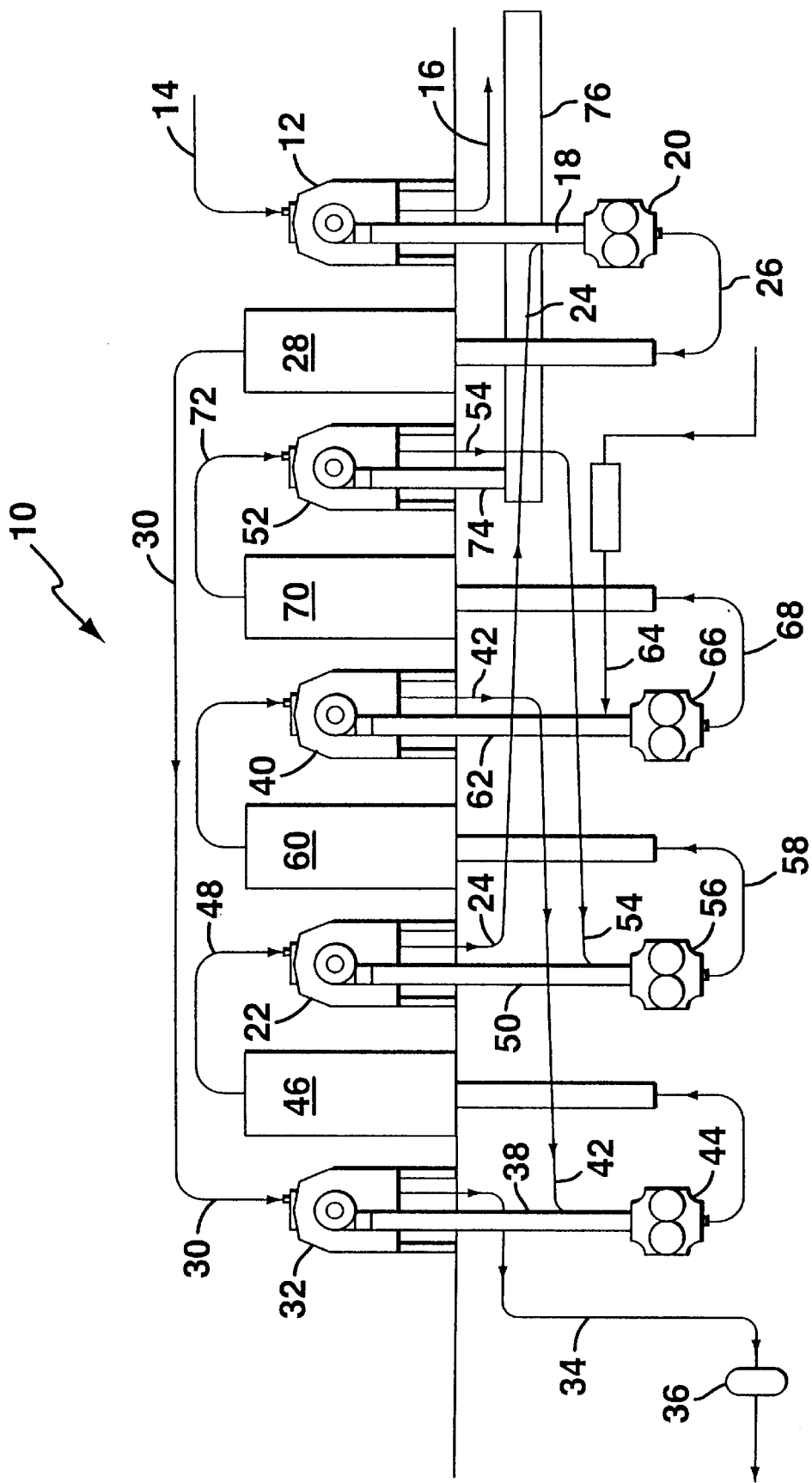
FIG_1

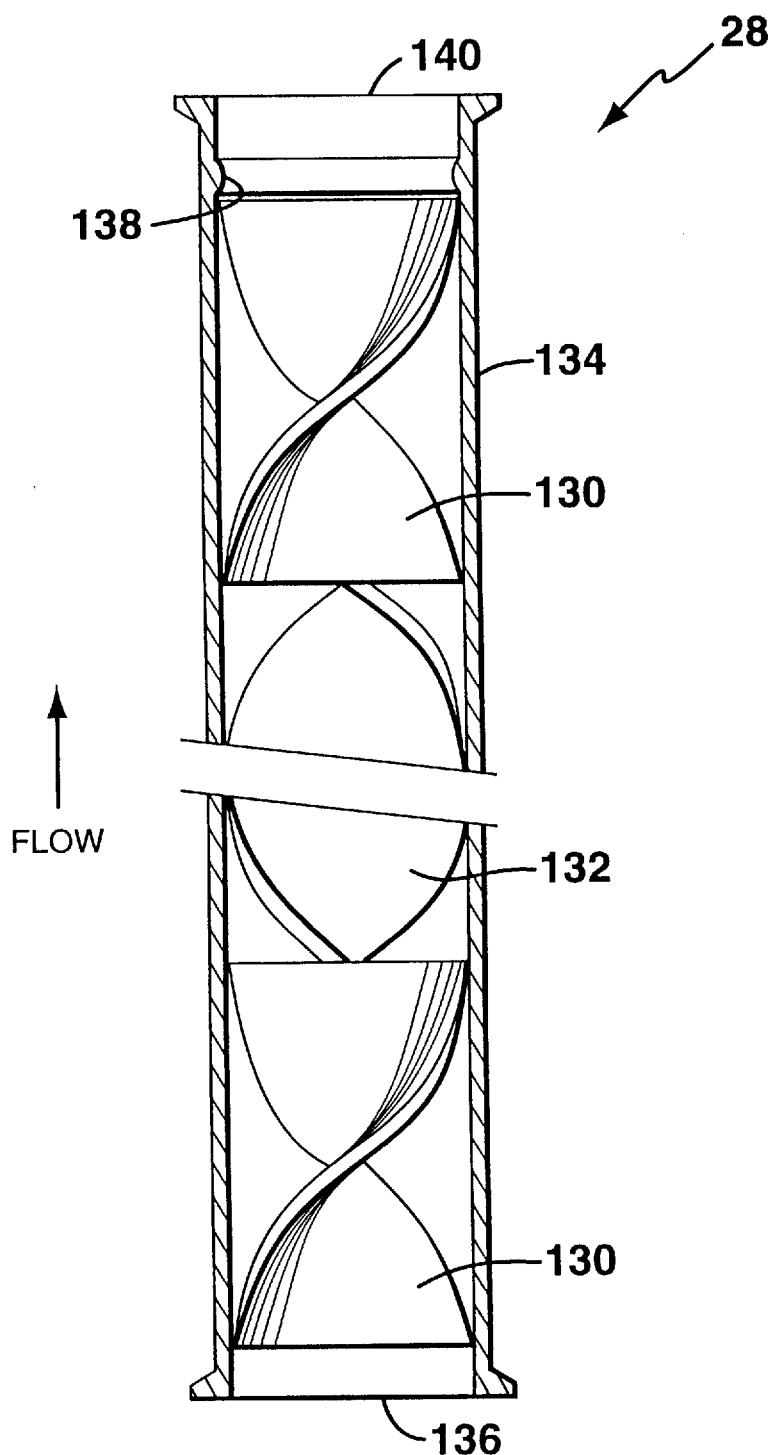
FIG_2

PULP WASH SYSTEM

This invention relates to an improved apparatus and method for washing the pulp produced by the extraction of juice from citrus fruit to recover residual sugar solids in the pulp.

BACKGROUND OF THE INVENTION

In the process of extracting juice from whole citrus fruit, a pulp is produced that contains residual juice and sugar solids, efficient recovery of which is economically essential. In the past the pulp has been processed through a plurality of finishers. The pulp produced by the finishers was mixed with a liquid to form a slurry before being pumped to the next finisher, with the mixing being achieved by means of powered screw conveyors or by mixing tanks with powered agitators. Mixing tanks are bulky and require space and headroom under the finisher platform. Additional, mixing tanks must be filled before the extraction process can begin. The residence time, i.e. the time required for filling the tanks, introduces scheduling and operational problems. Mixing conveyors are less bulky, but still require a considerable amount of space and headroom under the platform and are difficult to clean. Proper training and adherence to prescribed safety precautions is required in the operation of mixing tanks and, particularly mixing conveyors, to insure the well being of personnel operating the juice extractor.

SUMMARY OF THE INVENTION

The present invention provides a pulp wash which is compact, which require no separate, external power source, which do not require any residence time, but can be readily started and stopped, which is inherently more sanitary, which is easy to clean, which requires virtually no training and which is inherent safe to clean and operate. These and other attributes of the present invention, and many of the attendant advantages thereof, will become more readily apparent from a perusal of the drawings; wherein:

BRIEF DESCRIPTION OF THE DRAWINGS

FIG. 1 is a schematic representation of a four stage pulp wash system according to the present invention;

FIG. 2 is a cross-section view, with portions thereof broken away and eliminated, of a static in-line mixer utilized in the system illustrated in FIG. 1.

DESCRIPTION OF THE PREFERRED EMBODIMENT

Referring to FIG. 1, there is shown a schematic representation of a pulp wash system, indicated generally at 10, according to the present invention. The primary finisher 12 receives the pulp, i.e. juice sacs, some of which may be unbroken and contain juice, membranes, the membranes and juice sacs containing sugar solids, and some residual juice, from the juice extractor, which may be of the type shown in U.S. Pat. No. 2,780,988, for example. The extractor pulp is introduced to the top of the primary finisher 12 through conduit 14. The primary finisher, which may be of the type shown in U.S. Pat. No. 4,287,058, for example, compresses the pulp with the liquid juice being discharged through conduit 16 and generally collected to be processed with the juice from the extractor as fresh juice. The pulp from the primary finisher 12 is discharged into a chute 18, which chute connects with the inlet to pump 20. The liquid, often referred to as "liquor," produced by the second stage finisher 22 is introduced into the chute 12 through conduit 24 to act as a wash, i.e. to dissolve or otherwise take into solution sugar solids carried within the pulp. The pulp and liquor is then forced by a positive displacement pump 20 through a discharge conduit 26 into an in-line static mixer 28, which may be of the type manufactured and sold by the Chemineer Corporation as their Series 820 Sanitary Mixer, for example. Although some mixing of the pulp and liquor occurs within the pump 20 itself, the static mixer 28 thoroughly mixes the pulp and liquor so the sugar solids carried by the pulp become entrained with or dissolved in the liquor. A conduit 30 connects the outlet of the static mixer with the inlet of the first stage finisher 32. The liquor from the first stage finisher 32 is discharged through conduit 34 and is then delivered by a centrifugal pump 36 to an evaporator (not shown) for production of a high brix, frozen juice concentrate.

The pulp produced by the first stage finisher 32 is directed into chute 38 where the liquor produced by the third stage finisher 40 is introduced through conduit 42. A pump 44, which is similar to pump 20, forces the pulp from the first stage finisher 32 and the liquor from the third stage finisher 40 though an in-line static mixer 46, which preferably is similar to the static mixer 28. The resulting mixture is introduced to the second stage finisher 22 through conduit 48. The pulp produced by the second stage finisher 22 is discharged in the chute 50. As previously described, the liquor produced by the finisher 22 is introduced into the chute 18 to wash the pulp provided to the first stage finisher 32. The liquor produced by the fourth stage finisher 52 is introduced into the chute 50 through conduit 54. The pulp from the second stage finisher 22 and the liquor from the fourth stage finisher 52 are then forced by pump 56 through conduit 58 into static mixer 60 wherein the two are mixed and discharged into the inlet to the third stage finisher 40. The pulp produced by the third stage finisher 40 is discharged into chute 62 where fresh, potable water is introduced through conduit 64. The pulp produced by the third stage finisher 40 and the water is then pumped by pump 66 through conduit 68 into the static mixer 70 and the resulting mixture directed from the outlet of mixer 70 to the inlet of the fourth stage finisher 52 through conduit 72. The pulp from the fourth stage finisher 52 is discharged into chute 74 which in turn discharges into a screw conveyor 76 for transport and further processing.

It will be appreciated that the pulp is washed in counter-current fashion. The pulp is introduced to the first stage with a sugar content that is the same as the primary juice and exits the final stage with a very low sugar content. Water, with no sugar content whatever, enters the last stage at zero brix and exits the first stage with a high sugar content, having a Brix of 7 to 10 depending on the water to pulp ratio.

The in-line static mixers 28, 46, 60 and 70 are similar so that an explanation of one will be sufficient for an understanding of them all. The mixer 28, which is shown in FIG. 2, achieves the desired mixing by means of a plurality of elements 130 and 132 which are alternately stacked within a housing 134. The elements 130 are twisted to cause the pulp and liquid to be rotated in a clockwise direction, as viewed from the inlet end 136 of the housing 134, and the elements 132 are twisted to cause rotation in the opposite direction. The number of elements 130 equals the number of elements 132 so forces on the housing are balanced, i.e. the net torque on the housing is zero and there is thus no force tending to cause the housing to spin. A retention ridge 138 is provided on the interior wall of the housing 34 adjacent the upstream or outlet end 140 of the housing to hold the elements 130 and 132 within the housing 134.

The pumps 20, 44, 56 and 66 are also similar and are positive displacement pumps which preferably are rotary pumps of the lobar type, having either of the two or three lobes per rotor, such as those made by Waukesha or Triclover, for example, but may also be of screw pumps. However, low shear screw pumps are less desirably since there is virtual no mixing of the pumped ingredients with this type of pump.

While a preferred embodiment of the present invention has been illustrated and described herein, various changes and modifications may be made therein without departing from the spirit of the invention as defined by the scope of the appended claims, wherein it is claimed:

What I claim is:

1. In a pulp wash system for recovery of sugar solids resident in the pulp having at least one finisher and a pump for supplying thereto; the improvement comprising:

a static in-line mixer interposed between said pump and said finisher, and means for introducing a liquid to said pulp on the inlet side of said pulp, wherein said static in-line mixer comprises:
   a housing,
   a plurality of twisted elements alternately stacked within said housing, wherein a first number of said elements are twisted in a direction to cause pulp and liquid to be rotated in a first direction and a second number of elements are twisted in a direction to cause pulp and liquid to be rotated in an opposite direction, and
   a retention ridge positioned on the interior wall of the housing to hold the elements within the housing.

2. A multi-stage pulp wash system for increasing the recovery of juice and sugar solids remaining in the pulp discharged from the primary finisher of a juice extractor comprising:

a plurality of juice finishers connected to process the pulp in series;

a pump connected to supply pulp to the inlet of each of said finishers;

a static in-line mixer interposed between each of said pumps and the associated one of said finishers; and means for introduction of liquid into said pulp on the inlet side of each pump.

3. The multi-stage pulp wash system according to claim 2, wherein:

the liquid introduced to each finisher, except the last in said series, comes from the liquor produced by the subsequent finisher; and the liquid introduced to the last finisher is water.

4. A multi-stage pulp wash system according to claim 2, wherein each said static in-line mixers comprise a plurality of alternately twisted elements.

5. A multi-stage pulp wash system according to Claim 4, wherein a first number of elements are twisted in a direction to cause pulp and liquid to be rotated in a first direction and a second number of elements are twisted in a direction to cause pulp and liquid to be rotated in an opposite direction.

6. A multi-stage pulp wash system for increasing the recovery of juice and sugar solids remaining in the pulp discharged from the primary finisher of a juice extractor comprising:

a plurality of juice finishers connected to process the pulp in series;

a pump connected to supply pulp to the inlet of each of said finishers;

a static in-line mixer interposed between each of said pumps and the associated one of said finishers; and means for introduction of liquid into said pulp on the inlet said of each pump, wherein said static in-line mixers each comprise:
   a housing,
   a plurality of twisted elements alternately stacked within said housing, wherein a first number of said elements are twisted in a direction to cause pulp and liquid to be rotated in a first direction and a second number of elements are twisted in a direction to cause pulp and liquid to be rotated in an opposite direction, and
   a retention ridge positioned on the interior wall of the housing to hold the elements within the housing.

7. A multi-stage pulp wash system according to claim 6, wherein said housing includes an outlet end, and said retention ridge is positioned adjacent the outlet end of the housing.

8. A multi-stage pulp wash system according to Claim 7, wherein the liquid introduced to each finisher, except in the last in said series, comes from liquor produced by the subsequent finisher; and the liquid introduced to the last finisher is water.

* * * * *